US012096076B2

United States Patent
Sen et al.

(10) Patent No.: US 12,096,076 B2
(45) Date of Patent: Sep. 17, 2024

(54) SYSTEMS AND METHODS FOR PROVIDING IMPROVED SKIP AND DELAY FUNCTIONALITY IN MEDIA ASSETS

(71) Applicant: Rovi Guides, Inc., San Jose, CA (US)

(72) Inventors: Susanto Sen, Karnataka (IN); Ankur Anil Aher, Maharashtra (IN); Jeffry Copps Robert Jose, Tamil Nadu (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 18/242,835

(22) Filed: Sep. 6, 2023

(65) Prior Publication Data

US 2023/0412879 A1    Dec. 21, 2023

Related U.S. Application Data

(63) Continuation of application No. 17/558,211, filed on Dec. 21, 2021, now Pat. No. 11,792,479, which is a continuation of application No. 16/915,809, filed on Jun. 29, 2020, now Pat. No. 11,240,561.

(51) Int. Cl.
  *H04N 21/442* (2011.01)
  *H04N 21/45* (2011.01)
  *H04N 21/472* (2011.01)
  *H04N 21/81* (2011.01)
  *H04N 21/845* (2011.01)

(52) U.S. Cl.
  CPC . *H04N 21/44222* (2013.01); *H04N 21/44218* (2013.01); *H04N 21/4532* (2013.01); *H04N 21/47217* (2013.01); *H04N 21/812* (2013.01); *H04N 21/8456* (2013.01)

(58) Field of Classification Search
  None
  See application file for complete search history.

(56) References Cited

U.S. PATENT DOCUMENTS

| | | | |
|---|---|---|---|
| 8,246,454 B2 | 8/2012 | Zalewski | |
| 9,324,094 B1* | 4/2016 | Chalawsky | ........ G06Q 30/0242 |
| 9,386,328 B1 | 7/2016 | Crane et al. | |
| 9,448,619 B1 | 9/2016 | Kerns et al. | |
| 9,727,788 B2 | 8/2017 | Kansara | |
| 10,075,765 B2 | 9/2018 | Shaw et al. | |
| 10,560,506 B2 | 2/2020 | Kansara | |
| 11,240,561 B2 | 2/2022 | Sen | |
| 11,647,253 B2 | 5/2023 | Aher et al. | |

(Continued)

OTHER PUBLICATIONS

"Skip a track in queue", Liquidicel3: "Skip a track in queue", Sep. 23, 2014, retrieved from the Internet: URL: https://community.spotify.com/t5/Close d-Ideas/Skip-a-track-in-queue/idi-p/925927 [retrieved on Feb. 12, 2021], Sep. 23, 2014, 6 pages.

*Primary Examiner* — Alexander Q Huerta
(74) *Attorney, Agent, or Firm* — Haley Guiliano LLP

(57) ABSTRACT

Systems and methods are described for managing presentation of content. An action may be scheduled to occur at a first time within the presentation of the media asset, where the action may interrupt the presentation of the media asset. When a current presentation position is approaching the first time, an option to delay the action may be generated for presentation. In response to receiving selection of the option to delay the action, the action may be scheduled to occur at a later second time within the presentation of the media asset.

20 Claims, 9 Drawing Sheets

(56) References Cited

U.S. PATENT DOCUMENTS

| | | | |
|---|---|---|---|
| 11,720,923 B2* | 8/2023 | Panchaksharaiah | ........................ G06Q 30/0272 705/14.61 |
| 2002/0100041 A1 | 7/2002 | Rosenberg et al. | |
| 2002/0138831 A1 | 9/2002 | Wachtfogel et al. | |
| 2009/0288131 A1 | 11/2009 | Kandekar et al. | |
| 2010/0030639 A1 | 2/2010 | Feng et al. | |
| 2010/0273553 A1* | 10/2010 | Zalewski | ............. H04N 21/235 463/31 |
| 2011/0016498 A1* | 1/2011 | Tsuria | ................ H04N 21/8153 725/80 |
| 2012/0072272 A1 | 3/2012 | Kilar et al. | |
| 2013/0311575 A1 | 11/2013 | Woods et al. | |
| 2014/0337873 A1* | 11/2014 | Krug | ...................... H04H 60/33 725/18 |
| 2015/0052549 A1* | 2/2015 | Teixeira | ............. H04N 21/6587 725/32 |
| 2015/0067710 A1 | 3/2015 | Bhogal et al. | |
| 2015/0135211 A1* | 5/2015 | Gupta | ................ H04N 21/4325 725/32 |
| 2015/0242068 A1 | 8/2015 | Losey et al. | |
| 2016/0044344 A1 | 2/2016 | Plotnick et al. | |
| 2016/0182921 A1* | 6/2016 | Martin | ............. H04N 21/44226 725/18 |
| 2016/0189226 A1* | 6/2016 | Rao | .................... G06Q 30/0258 705/14.56 |
| 2017/0078727 A1 | 3/2017 | Wood et al. | |
| 2017/0195745 A1 | 7/2017 | Kumar Bvn et al. | |
| 2017/0332120 A1 | 11/2017 | Maynard et al. | |
| 2017/0347160 A1 | 11/2017 | Emans et al. | |
| 2018/0047068 A1 | 2/2018 | Brown et al. | |
| 2018/0301167 A1* | 10/2018 | Losey | ............. H04N 21/44226 |
| 2019/0297381 A1 | 9/2019 | Chung et al. | |
| 2020/0007916 A1 | 1/2020 | Keen et al. | |
| 2020/0099986 A1 | 3/2020 | Volk et al. | |
| 2020/0226388 A1 | 7/2020 | Ghessassi | |
| 2021/0144187 A1* | 5/2021 | Wood | ................ H04N 21/2393 |
| 2021/0409822 A1 | 12/2021 | Aher et al. | |
| 2021/0409823 A1 | 12/2021 | Sen | |
| 2022/0191590 A1 | 6/2022 | Sen | |

* cited by examiner

SYSTEMS AND METHODS FOR PROVIDING IMPROVED SKIP AND DELAY FUNCTIONALITY IN MEDIA ASSETS

CROSS-REFERENCE TO RELATED APPLICATION(S)

This application is a continuation of U.S. patent application Ser. No. 17/558,211, filed Dec. 21, 2021, which is a continuation of U.S. patent application Ser. No. 16/915,809, filed on Jun. 29, 2020, now U.S. Pat. No. 11,240,561, the disclosures of which are hereby incorporated by reference herein in their entireties.

BACKGROUND

This disclosure is directed to systems and methods for managing presentation of content. In particular, techniques are disclosed for presenting an option to skip current content and start presentation of a next media asset, and presenting an option to delay an action scheduled to occur within presentation of a media asset.

SUMMARY

In recent years, the popularity of video on demand (VOD) content (e.g., via a cable provider or over-the-top (OTT) content) consumed by users has continued to increase. For example, many users consume multiple parts of multi-part content (e.g., VOD television shows, movie series, multi-part series), such as during a "binge watching" session.

It is often desirable for content providers to present auxiliary content (e.g., advertisements) to the user prior to presentation of desired media content, or to interrupt the presentation of desired content to present the auxiliary content. However, a user is often not satisfied with the way auxiliary content is presented with the desired content. In one approach, a button may appear on the screen after a certain period of presenting the auxiliary content to enable the rest of the auxiliary content to be skipped. However, such an approach fails to take into consideration that the user may be enjoying the auxiliary content, and thus it may be undesirable to provide the option to skip the auxiliary content (e.g., because the user may inadvertently skip the auxiliary content). In another approach, while consuming the desired content, the user may be interrupted and forced to consume the auxiliary content, such as at a particularly exciting or attention-grabbing portion of the desired content (e.g., a climax), which may lead to user frustration. Further, when consuming multi-part content, up-next functionality may be provided, which allows the user to skip end credits and begin the next episode in the series. However, the triggering of such up-next functionality is generally performed at the same point in the program for all users, rather than being dynamically tailored to particular user's viewing habits or preferences.

To overcome these problems, systems and methods are provided herein to manage presentation of content, by generating for presentation a selectable option to skip presentation of the current media asset and start presentation of a next media asset based on whether the presentation of the current media asset is not likely to be of interest to the user. Accordingly, when content (e.g., auxiliary content) is not likely to be enjoyed by a user, a button to skip such content may be presented, or, if it is determined that the user is likely ready to skip current content and begin consumption of a next media asset (e.g., a next episode in a series), up-next functionality may be presented. Systems and methods described herein are also provided for scheduling an action, initially scheduled to occur at a first time within the presentation of the media asset, to occur at a later second time, in response to receiving selection of the option to delay the action. Such features provide an option for delaying an action (e.g., an advertisement) to a later time during presentation of a media asset, to enhance the user experience of consuming the asset (e.g., by allowing a user to delay presentation of an advertisement in order to finish a particular scene of the episode).

In some aspects of this disclosure, a content presentation application may be provided that generates for presentation a current media asset and identifies user information related to the current media asset. The content presentation application determines, based on the user information, whether the presentation of the current media asset is not likely to be of interest to the user, and in response to determining that the presentation of the current media asset is not likely to be of interest to the user, generates for presentation a selectable option to skip presentation of the current media asset and start presentation of a next media asset.

In some embodiments, a content presentation application generates for presentation a media asset, where an action is scheduled to occur at a first time within the presentation of the media asset, and where the action interrupts the presentation of the media asset. The content presentation application further generates for presentation, when a current presentation position is approaching the first time, an option to delay the action, and in response to receiving selection of the option to delay the action, schedules the action to occur at a later second time within the presentation of the media asset.

In some aspects of this disclosure, identifying the user information comprises monitoring activity of the user during the presentation of the current media asset, and determining whether the presentation of the current media asset is not likely to be of interest to the user is performed based on the monitored activity of the user. For example, a desired media asset may be selected by the user, and monitoring activity of the user during presentation of the current media asset (e.g., advertisement content presented prior to the desired media asset) includes receiving a user response to the advertisement content. The content presentation application, upon determining that the user response is indicative of interest in the advertisement content, may refrain from generating for presentation the selectable option to skip the presentation of the advertisement content and start the presentation of the desired media asset.

In some embodiments, determining whether the user response is indicative of interest in the advertisement content comprises determining whether the user response replicates a component of the advertisement content for a predetermined time period. For example, the advertisement content may be associated with metadata, and determining whether the user response replicates the component of the advertisement content may comprise comparing the user response to the metadata. The component of the advertisement content may be at least one of an audio component or a visual component, and the user response may be at least one of gestures or poses performed in response to the advertisement content or an audio response to the advertisement content.

In some aspects of this disclosure, determining whether the portion of the presentation of the current media asset is not likely to be of interest to the user comprises determining whether a current presentation position is associated with a segment similar to a previously skipped segment (detected based on monitoring user activity during presentation of the current media asset in a current session). The presentation of the selectable option to skip presentation of the current media asset and start presentation of the next media asset may be performed in response to determining that the current presentation position is associated with the segment similar to the previously skipped segment.

In some embodiments, identifying the user information comprises retrieving a profile of the user, and determining whether a portion of the presentation of the current media asset is not likely to be of interest to the user is performed based on the retrieved profile. The retrieved profile may include the viewing history of the user, and such viewing history may be used to determine whether the current presentation is not likely to be of interest to the user. The viewing history may include at least one of the current media asset or a media asset similar to the current media asset, and a presentation position within the current media asset or the similar media asset at which presentation was previously skipped.

In some aspects of this disclosure, the above-mentioned action comprises presentation of advertisement content. The advertisement content for presentation at the first time may comprise a first length of time, and advertisement content for presentation at the second time may comprise a second length of time, where the second length of time is greater than the first length of time. In this way, the user may be penalized for delaying the action (e.g., to encourage the user to sparingly employ the delay functionality).

In some embodiments, the content presentation application may generate for presentation an indication that, in the absence of receiving selection of the option to delay the action, the advertisement content will be presented at the first time (e.g., a countdown).

The content presentation application may generate for presentation, when the current presentation position is approaching the second time, an option to further delay the action, and in response to receiving selection of the option to further delay the action, scheduling the action to occur at a third time within the presentation of the media asset, where the third time is later than the first time and the second time.

In some embodiments, the user is permitted to further delay the action a predetermined number of times within the presentation of the media asset. Further, when a current presentation position is approaching a cutoff time, the content presentation application may determine whether the action has occurred during the presentation of the media asset, and in response to determining that the current presentation position has not occurred during the presentation of the media asset, perform the action at the cutoff time.

In some aspects of this disclosure, respective actions are scheduled to be presented at respective time intervals within the presentation of the media asset, and for each time interval of the respective time intervals, an option to delay the presentation of the respective action is presented. That is, over the course of the presentation of the media asset, an opportunity to delay presentation of each advertisement may be provided to the user.

In some embodiments, the content presentation application may compute a probability of user consumption of the advertisement content during a segment of the presentation of the media asset, where the timing of the action is scheduled based on the computed probability. For example, a user profile of a user that is to consume the media asset is identified, and the probability is computed based on a comparison of the user profile to at least one of a story line or subject of a segment of the media asset, characters or objects of the segment, a background of the segment, audio or annotations of the segment, or other details of the segment.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Figure 1A:
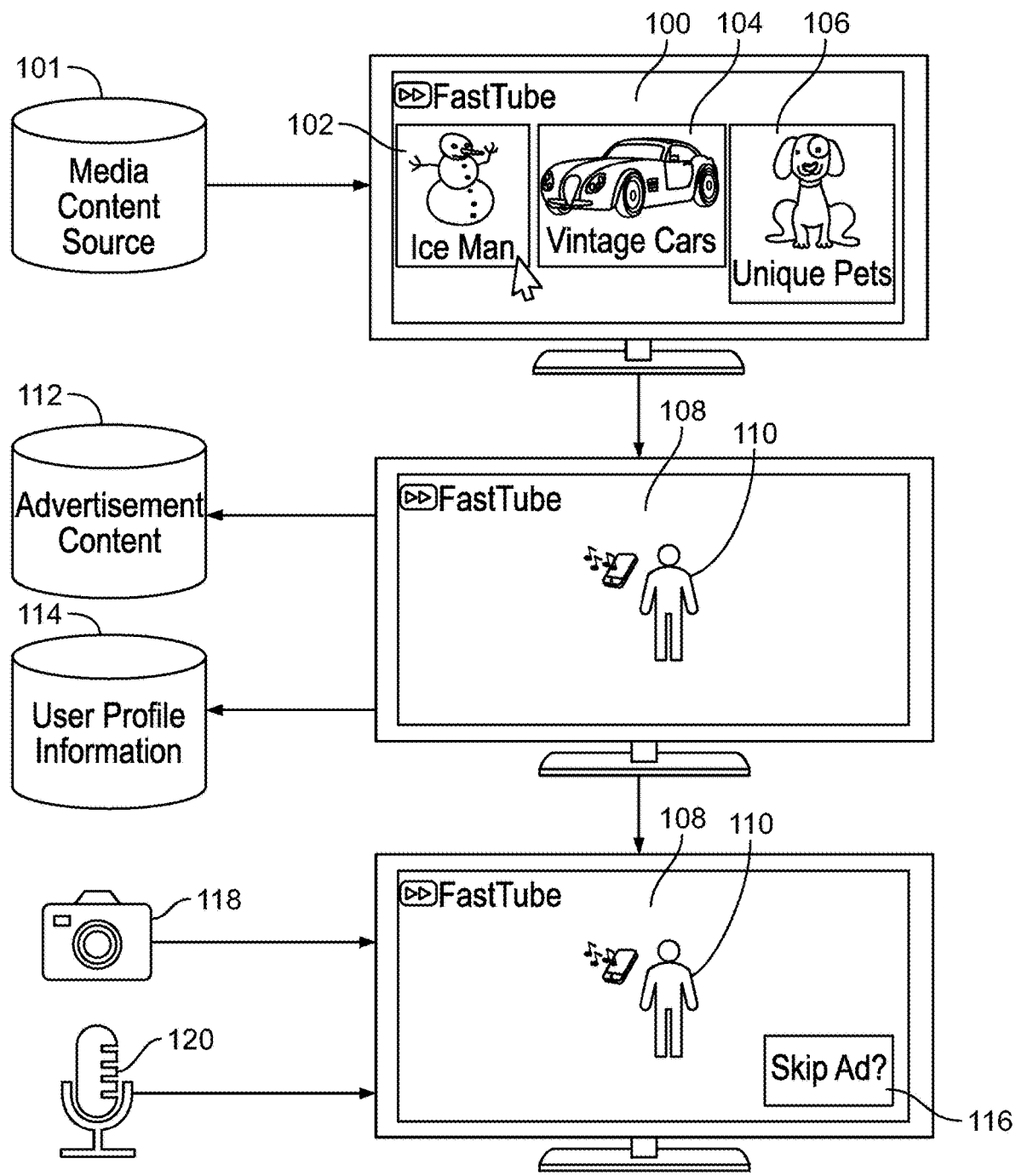
FIG. 1A shows an example of presenting a selectable option to skip presentation of a current media asset and start presentation of a next media asset, in accordance with some embodiments of this disclosure.
Figure 1B:
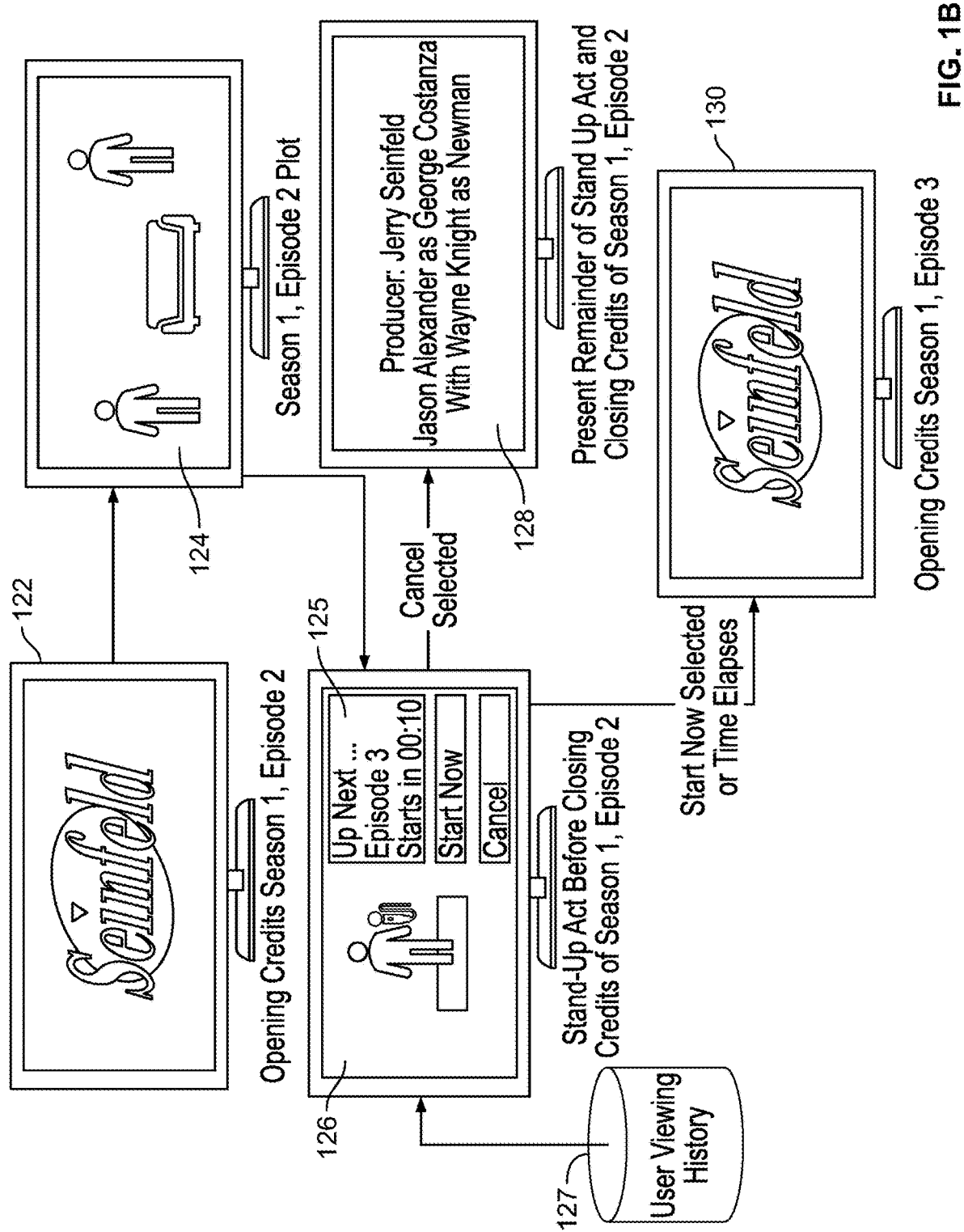
FIG. 1B shows an example of presenting a selectable option to skip presentation of a current media asset and start presentation of a next media asset, in accordance with some embodiments of this disclosure.

FIGS. 1A-1B depict illustrative processes of presenting an option to skip current content and start presentation of a next media asset. FIG. 1A shows an exemplary display screen 100 (e.g., provided by a content presentation application, implemented on user equipment) that is provided on a display of a user device, presenting one or more media assets 102, 104, 106 for selection by the user retrieved from media content source 101. As referred to herein, the term "media asset" should be understood to mean an electronically consumable user asset, such as television programming, as well as pay-per-view programs, on-demand programs (as in video-on-demand (VOD) systems), Internet content (e.g., streaming content, downloadable content, webcasts, etc.), video clips, audio, playlists, websites, articles, electronic books, blogs, social media, applications, games, and/or any other media or multimedia, and/or combination of the same. As shown in FIG. 1A, selection of media asset 102, titled "Ice Man," is received from the user.

Prior to presenting the selected media asset to the user, it may be desirable to present other media assets or content (e.g., advertisement content) prior to presenting the media asset desired by the user. For instance, the "FastTube" service provider depicted in FIG. 1A may provide content free of charge to users, but may require users to view auxiliary content (e.g., advertisement content) in order to generate revenue. Alternatively, a service provider may be paid a subscription fee by a user, and additionally present advertisements to a user (e.g., a video on demand via a cable provider or OTT platform). The content presentation application may reference advertisement content database 112 when generating advertisement content. For example, display screen 108 shows advertisement content 110 depicting an actor and a mobile device with musical notes indicating audio is being played as part of the advertisement. Those of skill in the art will appreciate that advertisement content may be an advertisement concerning any product or service (e.g., an advertisement for a new mobile device, a trailer for a new movie or television show, etc.).

In the example of FIG. 1A, the content presentation application may selectively generate for presentation skip ad button 116 on display screen 108, based on a determination of whether a user is not likely to be interested in the advertisement content. For example, the content presentation application may identify user information associated with the user consuming the ad (e.g., information 114 associated with a profile of the user with the service provider and/or viewing history of the user; information retrieved from various other devices, such as internet-of-things devices, associated with the user; a detected user response to, or user engagement with, the advertisement detected by camera 118 and/or microphone 120, etc.). The content presentation application may then determine, based on the user information, whether the presentation of the current media asset is not likely to be of interest to the user. In the example of FIG. 1A, in response to determining that the presentation of the current media asset is not likely to be of interest to the user, the content presentation application generates for presentation selectable option 116, enabling the user to skip presentation of a remainder of the current media asset (e.g., advertisement content 110) and start presentation of a next media asset (e.g., the selected media asset 102). On the other hand, if the content presentation application had determined that the user is likely to be interested in the current advertisement content 110, the selectable option 116 to skip the advertisement may not be presented to the user.

In the example of FIG. 1B, the selectable option may be "up-next functionality," which enables skipping presentation of a current media asset (e.g., an episode of a television series, such as "Seinfeld," season 1, episode 2) and starting presentation of a next media asset (e.g., the next episode of "Seinfeld," such as season 1, episode 3). Such up-next functionality (e.g., selectable option 125) may be triggered based on user information. In the example of FIG. 1B, the episode may comprise a plurality of segments including opening credits 122; a plot 124 which may include one or more storylines; a stand-up act 126, such as performed by the actor Jerry Seinfeld immediately prior to closing credits 128; and the closing credits 128. Once the presentation of the current media asset reaches the stand-up act 126 portion of the episode, the content presentation application may determine whether the user is not likely to be interested in such segment (e.g., based on user viewing history 127). For example, other episodes of the series may also include a similar stand-up act performed immediately prior to the closing credits, and the content presentation application may determine that the user has previously viewed the currently presented episode, or one or more other episodes of the series (or other similar media content). In such circumstance, if the content presentation application determines that the user has previously skipped the stand-up act (or similar content) in the previously viewed episodes, the content presentation application may determine that the user is not likely to be interested in the stand-up act currently being presented. In such instance, the content presentation application may generate for presentation up-next selectable option 125, which enables the user to skip to a next media asset (e.g., the next episode 130 in season 1 of "Seinfeld"). Alternatively, the content presentation application may determine whether to present the selectable option 125 based on monitoring user activity during a current session of the presentation of the current media asset (e.g., if the user has skipped portions of the media asset during the current session in which an actor performs a song, the option 125 may be presented during a current or upcoming similar scene).

The user selection of the up-next option 125 may be received via various methods (e.g., remote control, voice input, touch-screen input, etc.). The user may affirmatively halt or initiate the up-next functionality (e.g., via voice input). In some embodiments, in the absence of user instruction to the contrary, the next episode may automatically begin (e.g., when the countdown timer runs out), or the next episode will not begin without affirmative user instruction. In some embodiments, the selectable option 125 may be generated for presentation to the user only if the current segment is the final segment of the media asset prior to the closing credits.

The viewing history 127 may be maintained for various users (e.g., in storage 308, FIG. 3), and may associate points within a media asset previously skipped by the user (e.g., fast-forwarded, or a point at which the user terminated presentation of the media asset without completing presentation of the media asset) with particular scenes or storylines of the media asset. For example, metadata associated with the media asset may indicate that the stand-up scene of an episode of "Seinfeld" (e.g., immediately before the closing credits) commences at a particular time during presentation of the media asset (e.g., at 20:45 into the episode). The content presentation application may detect that the user elected to skip this scene in this particular episode, and may store this association in viewing history 127 for later retrieval (e.g., when a similar scene appears in a later episode of "Seinfeld" viewed by the user). The content presentation application may store such associations in the viewing history of the user regardless of the device being used to access the media asset.

Figure 2:
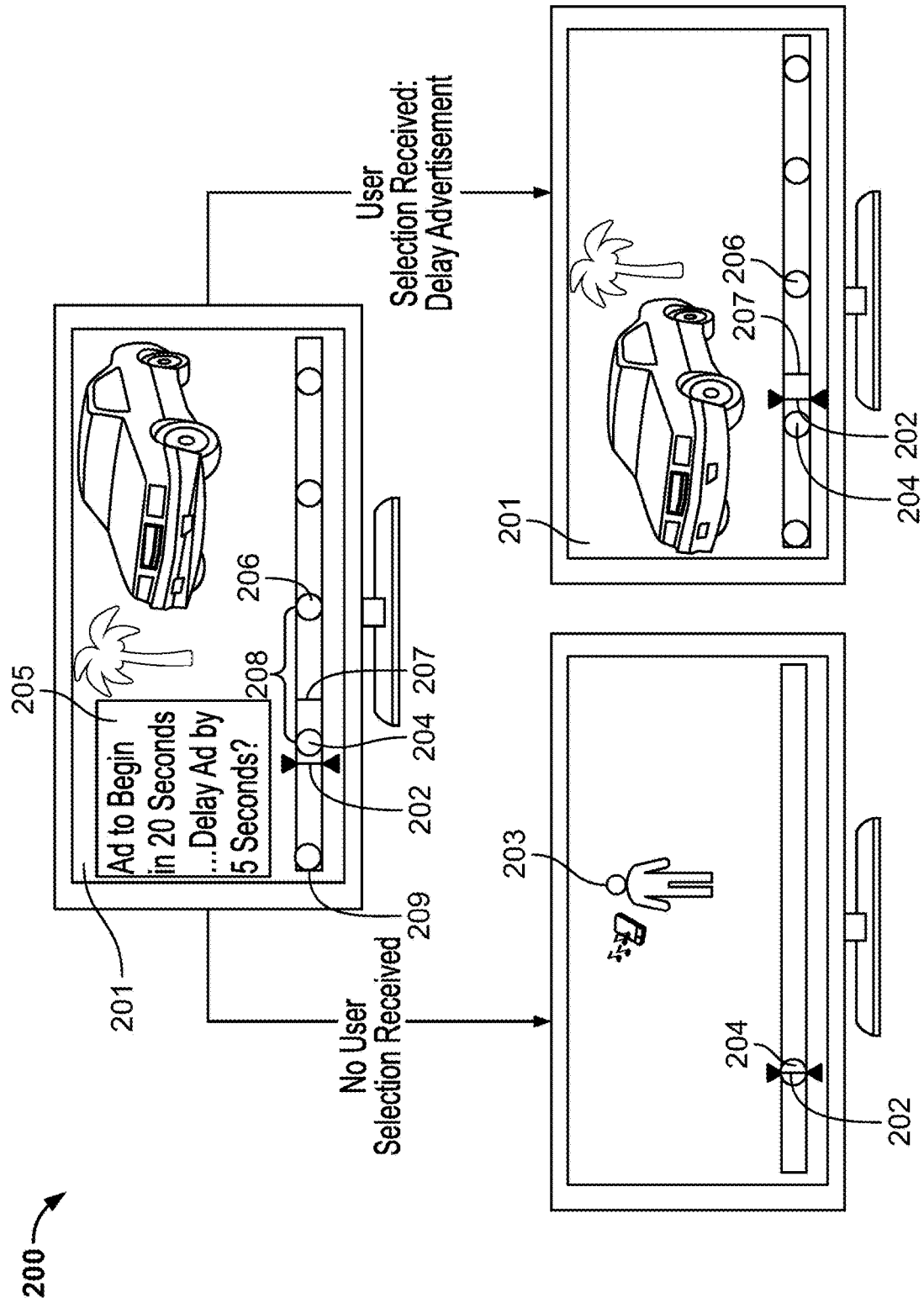
FIG. 2 shows an example of scheduling an action to occur at a later second time within the presentation of a media asset, in accordance with some embodiments of this disclosure.

In another aspect of this disclosure, FIG. 2 shows an example of delaying the occurrence of an action (e.g., presentation of advertisement content 203) within the presentation of current media asset 201, where such action is scheduled to interrupt the presentation of the media asset 201. The user may be currently viewing media asset 201 (e.g., provided by a video-on-demand provider) having a start time 209, and where icon 202 indicates a current presentation position of the media asset 201. An action may be scheduled to occur at first time 204 within the presentation of the media asset 201. When the content presentation application determines that the first time 204 is approaching (e.g., that first time 204 is within a predetermined time period from the current presentation position 202), the user may be notified and provided with a selectable option 205 to delay the action to a later second time 207 within the presentation of the media asset. The delay may be associated with a specified delay time (e.g., set by the user or advertisement provider) to delay the advertisement content. If user selection of option 205 is not received before the scheduled time of action 203, the action (e.g., presentation of advertisement content) 203 may occur at the scheduled first time 204.

On the other hand, as shown in FIG. 2, in response to receiving selection of the option 205 to delay the action 203, the action 203 may be scheduled to occur at the second time 207 within the presentation of the media asset 201. In this way the user is able to delay the occurrence of the action in order to continue viewing the current media asset (e.g., in this case, to watch the automobile depicted in the media asset 201 move past the palm tree). This may be desirable for a user in a circumstance where the current presentation position 202 of the media asset 201 is a particularly interesting to the user (e.g., a climax of the plot of the media asset). In some embodiments, an opportunity to further delay the action 203 (e.g., to a later time than second time 207) may be provided to the user. For example, such further delay option may be presented a predetermined time after the initial delay option is selected. The action (e.g., presentation of advertisement content 203) may be required to occur in time interval 208, which may be bounded by first time 204 and cutoff time 206. In some embodiments, an opportunity to further delay the occurrence of the action 203 may not be presented if a delay time of such further delay would cause the action to be scheduled to occur after the cutoff time 206. Alternatively, the occurrence of the action 203 may be scheduled to automatically occur at the cutoff time 206.

Figure 3:
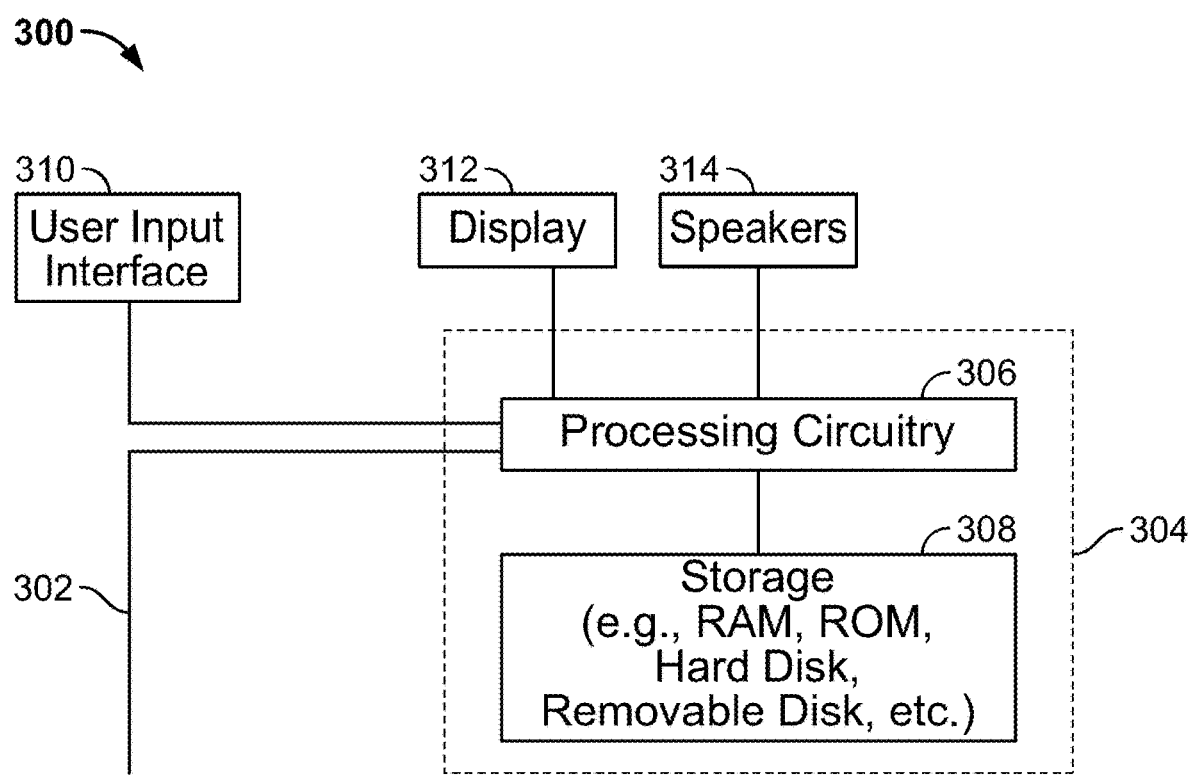
FIG. 3 is a block diagram of illustrative user equipment, in accordance with some embodiments of this disclosure.
Figure 4:
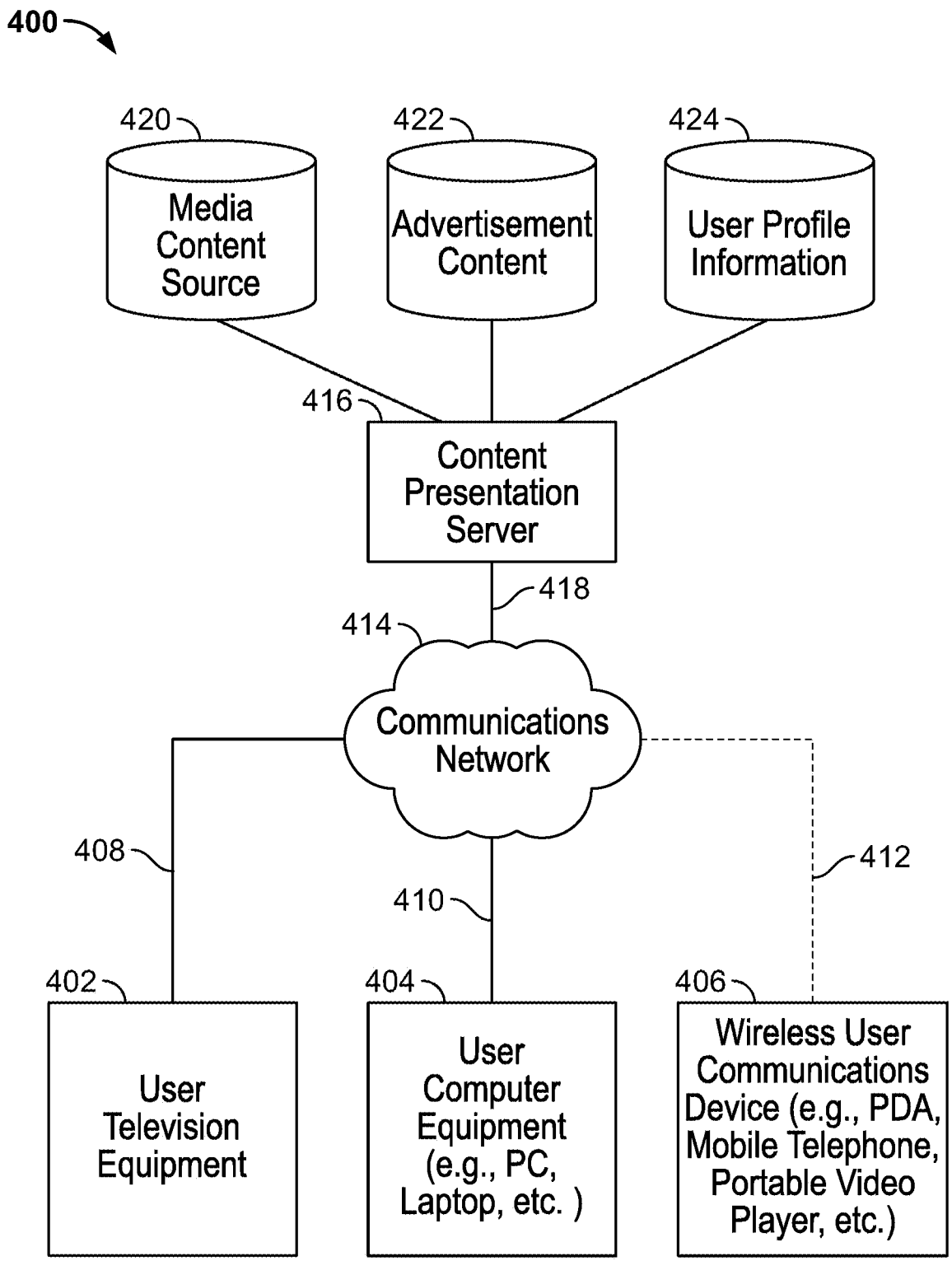
FIG. 4 is a block diagram of an illustrative system, in accordance with some embodiments of this disclosure.

FIGS. 3-4 show exemplary devices, systems, servers and related hardware for presenting an option to skip current content and start presentation of a next media asset, in accordance with some embodiments of this disclosure, and/or presenting an option to delay an action scheduled to occur within presentation of a media asset, in accordance with some embodiments of this disclosure. As shown in FIG. 3, user equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a content presentation application stored in memory (i.e., storage 308). Specifically, control circuitry 304 may be instructed by the content presentation application to perform the functions discussed above and below. For example, the content presentation application may provide instructions to control circuitry 304 to generate the above-described displays. In some implementations, any action performed by control circuitry 304 may be based on instructions received from the content presentation application.

In client/server-based embodiments, control circuitry 304 may include communications circuitry suitable for communicating with a content presentation server (e.g., server 416 in FIG. 4) or other networks or servers. The instructions for carrying out the above-mentioned functionality may be stored on the content presentation server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as content data and content application data that are described above. Nonvolatile memory may also be used (e.g., to launch a boot-up routine and other instructions). Cloud-based storage may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and down-converting content into the preferred output format of the user equipment device 400. Control circuitry 304 may also include digital-to-analog converter circuitry and analog-to-digital converter circuitry for converting between digital and analog signals. The tuning and encoding circuitry may be used by the user equipment device to receive and to display, to play, or to record content. In some embodiments, the control circuitry may include an HD antenna.

In one embodiment, speakers 314 may be provided as integrated with other elements of user equipment device 300 or may be stand-alone units. The audio and other content displayed on display 312 may be played through speakers 314. In some embodiments, the audio may be distributed to a receiver (not shown), which processes and outputs the audio via speakers 314.

The content presentation application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected. User input interface 310 may be any suitable user interface (e.g., a remote control, mouse, trackball, keypad, keyboard, touch screen, touchpad, stylus input, joystick, microphone, voice recognition interface, or other user input interfaces). Display 312 may be provided as a stand-alone device or integrated with other elements of each one of user equipment device 300 and user equipment system 301. For example, display 312 may be a touchscreen or touch-sensitive display. In such circumstances, user input interface 310 may be integrated with or combined with display 312.

In some embodiments, the content presentation application is a client/server-based application. Data for use by a thick or thin client implemented on user equipment device 300 is retrieved on-demand by issuing requests to a server remote to the user equipment device 300. In one example of a client/server-based content presentation application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the content presentation application is downloaded and interpreted or otherwise run by an interpreter or virtual machine (run by control circuitry 304). In some embodiments, the application may be encoded in the ETV Binary Interchange Format (EBIF), received by control circuitry 304 as part of a suitable feed, and interpreted by a user agent running on control circuitry 304. For example, the application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the application may be, for example, encoded and transmitted in an MPEG-2 object carousel with the MPEG audio and video packets of a program.

FIG. 4 shows an illustrative block diagram of system 400 for presenting an option to skip current content and start presentation of a next media asset, in accordance with some embodiments of this disclosure, and/or presenting an option to delay an action scheduled to occur within presentation of a media asset, in accordance with some embodiments of this disclosure. System 400 may include a user equipment device (e.g., user television equipment 402, user computer equipment 404, wireless user communications device 406), content presentation server 416, media content source 420, advertisement content database 422, and user profile information database 424. Although FIG. 4 shows media content source 420, advertisement content database 422, and user profile information database 424 as individual components and as separate from content presentation server 416, in some embodiments, any of those components may be combined and/or integrated with content presentation server 416. Media content source 101, advertisement content database 112, and user profile information database 114 may be implemented as media content source 420, advertisement content database 422, and user profile information database 424, respectively. Content presentation server 416 may be communicatively coupled to a user equipment device by way of communications network 414 (e.g., via communications path 418) and may be communicatively coupled to media content source 420, advertisement content database 422, and user profile information database 424, which may be included in, or separate from, communications network 414. Content presentation server 416 may be configured to retrieve content from media content source 420 for consumption at a user equipment device (e.g., user television equipment 402, user computer equipment 404, wireless user communications device 406), retrieve advertisement content from advertisement content database 422 to be presented prior to, or during, presentation of the desired content (e.g., in the example of FIG. 1A and FIG. 2), and retrieve user profile information from user profile information database 424 (e.g., to assist in determining whether to present skip-ad button 116 in FIG. 1A or up-next button 125 in FIG. 1B). Content presentation server 416 may have a similar configuration to user equipment 300 (e.g., the content presentation server 416 may include I/O path 302 and control circuitry 304 including storage 308 and processing circuitry 306), although the content presentation server may not include a user input interface, a display, or speakers. The server may store and execute various software modules (e.g., the content presentation application), which may be stored in storage of the server and executed via processing circuitry of the server, for implementing the content presentation functionality of the system 400. In some embodiments, media content source 420, advertisement content database 422, and user profile information database 424 may communicate directly with user equipment devices 402, 404, and 406 via communication paths (not shown).

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a content presentation application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some user television equipment 402, include a tuner allowing for access to television programming. The content presentation application may have the same layout on various different types of user equipment or may be tailored to the display capabilities of the user equipment. For example, on user computer equipment 404, the content presentation application may be provided as a web site accessed by a web browser. In another example, the content presentation application may be scaled down for wireless user communications devices 406.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 602-11x, etc.), or other short-range communication via wired or wireless paths. BLUETOOTH is a certification mark owned by Bluetooth SIG, INC. The user equipment devices may also communicate with each other directly through an indirect path via communications network 414.

Media content source 420 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 420 may be the originator of content (e.g., a television broadcaster, a Webcast provider, etc.) or may not be the originator of content (e.g., an on-demand content provider, an Internet provider of content of broadcast programs for downloading, etc.). Media content source 420 may include cable sources, satellite providers, on-demand providers, Internet providers, over-the-top content providers, or other providers of content. Media content source 420 may also include a remote media server used to store different types of content (including video content selected by a user), in a location remote from any of the user equipment devices.

Content presentation applications may be, for example, stand-alone applications implemented on user equipment devices. For example, the content presentation application may be implemented as software or a set of executable instructions which may be stored in storage 308, and executed by control circuitry 304 of user equipment device 300. In some embodiments, content presentation applications may be client-server applications where only a client application resides on the user equipment device, and server application resides on a remote server. For example, content presentation applications may be implemented partially as a client application on control circuitry 304 of user equipment device 300 and partially on a remote server as a server application (e.g., content presentation server 416) running on control circuitry of the remote server. When executed by control circuitry of the remote server (such as content presentation server 416), the content presentation application may instruct the control circuitry to insert auxiliary content (e.g., an advertisement) prior to or during desired content, and/or skipping functionality (e.g., as in the examples of FIGS. 1A-1B) or delay functionality (e.g., as in the examples of FIG. 2). The server application may instruct the control circuitry of the content presentation server 416 to transmit data for storage on the user equipment. The client application may instruct control circuitry of the receiving user equipment to provide skipping functionality (e.g., as in the examples of FIGS. 1A-1B) or delay functionality (e.g., as in the examples of FIG. 2).

Content and/or media player data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media player data described above. In addition to content and/or media player data, providers of OTT content can distribute content presentation applications (e.g., web-based applications or cloud-based applications), or the content can be displayed by content presentation applications stored on the user equipment device.

Media player system 400 is intended to illustrate a number of approaches, or network configurations, by which user equipment devices and sources of content may communicate with each other for the purpose of accessing content and presenting skipping and delay functionality (e.g., in the examples of FIGS. 1A-1B and FIG. 2). The embodiments described herein may be applied in any one or a subset of these approaches, or in a system employing other approaches for delivering content and providing skip or delay functionality.

Figure 5:
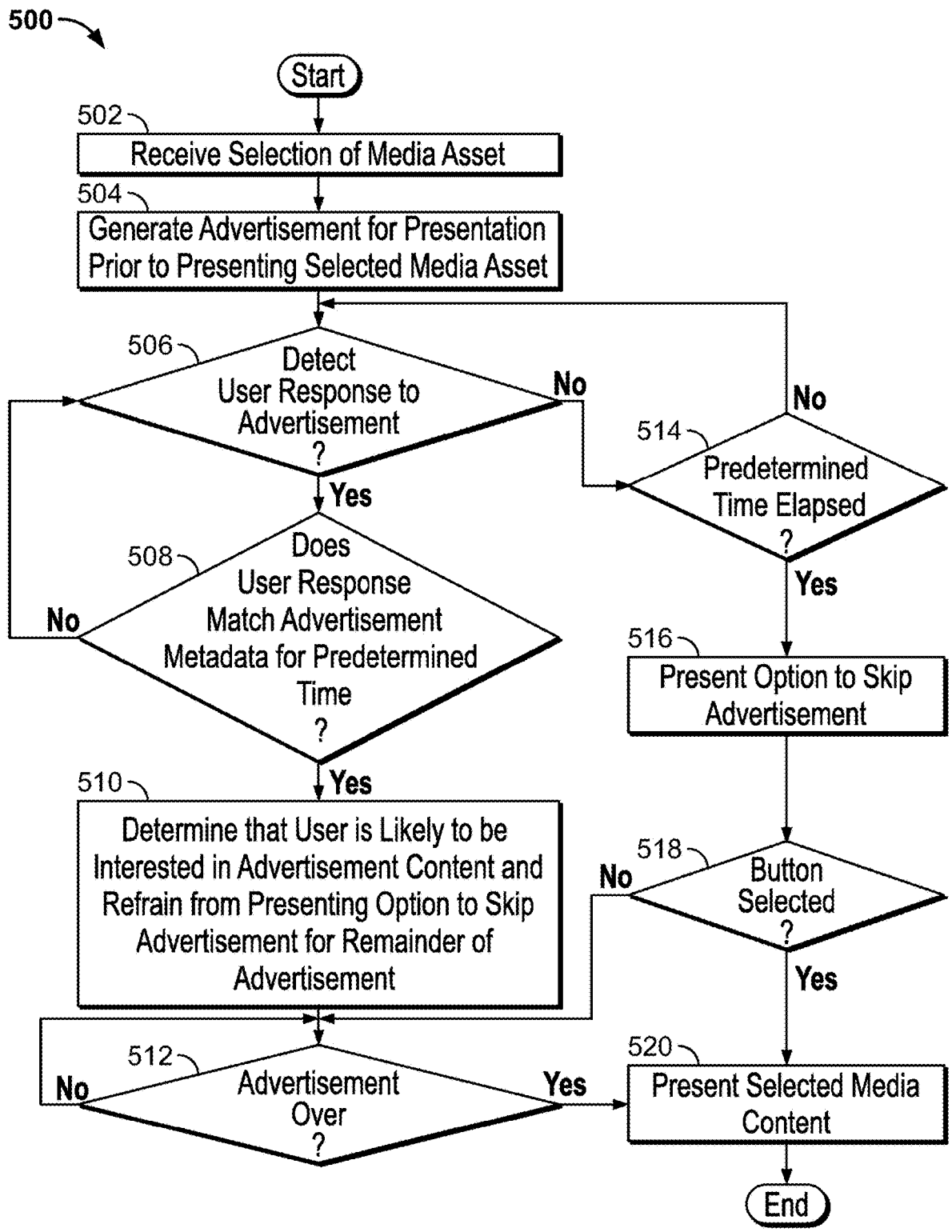
FIG. 5 is a flowchart of a detailed illustrative process for generating for presentation a selectable option to skip presentation of the current media asset and start presentation of a next media asset, in accordance with some embodiments of this disclosure.

FIG. 5 depicts an illustrative flowchart of a process of presenting a selectable option to skip presentation of a current media asset and start presentation of a next media asset, in accordance with some embodiments of the disclosure. Process 500 may be executed by control circuitry 304 (e.g., in a manner instructed to control circuitry 304 by the content presentation application). Control circuitry 304 may be part of user equipment (e.g., a device that may have any or all of the functionality of user television equipment 402, user computer equipment 404, and/or wireless communications device 406), or of content presentation server 416 separated from the user equipment by way of communication network 414, or distributed over a combination of both. In addition, one or more steps of process 500 may be incorporated into or combined with one or more steps of any other process or embodiment (e.g., process 600 of FIG. 6, process 700 of FIG. 7, process 800 of FIG. 8).

At step 502, control circuitry 304 may receive selection of a media asset from a user (e.g., media asset 102 of FIG. 1A). At step 504, control circuitry 304 may generate an advertisement for presentation (e.g., retrieved from advertisement content database 112 of FIG. 1A). At step 506, during presentation of the advertisement content (e.g., advertisement content 110 of FIG. 1A), the control circuitry may determine (e.g., based on input received via user input interface 310 of FIG. 3) whether a user response to the advertisement has been received. For example, the content presentation application may monitor activity of the user during presentation of the advertisement content and determine, based on the user activity (e.g., detected by camera 118, microphone 120, accelerometers, and/or biometric devices, etc.) whether the user activity is indicative of interest in the advertisement content and thus whether a user is likely to be interested in the advertisement content. The advertisement may include various audio information (e.g., catch phrases, jingles, songs, dialogues, etc.) and/or visual information (e.g., dance moves or athletic movements performed by actors in the advertisement content). In some embodiments, the advertisement content may be associated with metadata (e.g., pre-generated and stored in advance, and/or provided to the content presentation application by an advertising provider), which includes, for example, lyrics and/or music details of audio in the advertisement (e.g., in the form of information related to word string, word tone, word emphasis, word duration) and/or details of various gestures of actors in the advertisement content (e.g., body pose, relative positions, associated motions, etc.).

The content presentation application may determine whether the user response is indicative of interest in the advertisement content based on whether the user response replicates a component (e.g., an audio component or a visual component) of the advertisement content for a predetermined time period, or whether a user expresses joy or enthusiasm during the presentation of the advertisement (e.g., for example, upon detecting that the user says "I love this ad!" aloud). For example, at the start time of the advertisement content (e.g., advertisement content 110 of FIG. 1A), an audio response of the user may be received by the microphone 120. The content presentation application may transcribe the audio response into a string of text (e.g., by any suitable automatic speech recognition technique), or transcription of the audio response of the user may be achieved by external transcription services (e.g., Amazon Transcribe by Amazon, Inc. of Seattle, WA and Google Speech-to-Text by Google, Inc. of Mountain View, CA). The transcribed text string may be compared to text included in metadata associated with the advertisement content to determine whether there is a match. Additionally or alternatively, control circuitry 304 may analyze the audio response of the user to identify various acoustic characteristics (e.g., word tone, word emphasis, word duration, voice alteration, volume, speed, etc.) related to the audio response of the user. Such acoustic characteristics may be compared to the advertisement metadata, which may include information on such acoustic characteristics for the advertisement content, to determine whether there is a match.

For example, control circuitry 304 (or transcription circuitry) may analyze the wave amplitude of the audio response of the user to determine the volume at which the user spoke the voice search query, and/or analyze frequency data of the audio response to determine the pitch and tone of the voice search query. Control circuitry 304 may isolate a portion of the audio response and determine the duration of each portion and/or compare each isolated portion of the audio response to determine the relative level of emphasis placed on each word by the user. As another example, an audio signature of the user (e.g., associated with a user profile) may be compared to the audio response of the user to determine whether the user has altered his or her voice in the audio response, and the altered voice may be used as a parameter to be compared to metadata of the advertisement content.

The user response to visual components of the advertisement (e.g., poses or gestures, absolute and relative positions of various body parts, motion associated with pose, successive poses, etc., during presentation of the advertisement content) at step 506 may be detected using camera 118. For example, to determine gesture and/or pose information of the user, image processing methods such as object recognition, facial recognition, edge detection, or any other suitable image processing method may be utilized to identify portions of the user's body and determine positions of the identified portions (e.g., in a coordinate plane). Such gesture and/or pose information of the user may be compared to metadata (e.g., gesture of pose information related to an actor in the advertisement content) associated with the advertisement content.

At step 508, upon detecting a user response to the advertisement, the control circuitry may determine whether the detected user response matches (e.g., sufficiently mimics or imitates) the advertisement content for a predetermined period of time. For example, the content presentation application may compare the user response (e.g., the audio and/or visual response of the user to the advertisement) to the metadata of the advertisement to determine whether there is a match. In some embodiments, the content presentation application may compute a score based on the comparison, and determine that there is a match based on whether the score exceeds a predetermined threshold. Control circuitry 304 may also determine whether there is a match for a sufficient period of time. For example, if the user has continuously (or in some embodiments, non-continuously) mimicked the advertisement content for a predetermined period of time (e.g., the user has mimicked the advertisement over 50% of the elapsed time of the advertisement content from the start of such content), control circuitry 304 may determine that there is a match. On the other hand, if the user mimics the advertisement content for only a short period of time (e.g., the first 10% of the elapsed time of the advertisement), processing may continue at step 514.

At step 514, in a case that the control circuitry has not detected a user response to the advertisement content, the control circuitry may determine whether a predetermined time period has elapsed from the beginning of the advertisement content (e.g., 5 seconds). If the predefined time period has not yet elapsed, control circuitry 304 may keep checking for a user response to the advertisement content at step 506. At step 516, if the predetermined time period has elapsed, control circuitry 304 may generate for presentation the option to skip the advertisement content, since the lack of a user response may indicate to control circuitry 304 that the user is not likely to be interested in the advertisement content. At step 518, if control circuitry 304 receives user selection of the option to skip the advertisement, such selection causes, at step 520, the presentation of the advertisement to end, and control circuitry 304 starts presentation of the selected media content (e.g., media asset 102 in FIG. 1A).

At step 510, after determining that the user response matches the advertisement metadata for the predetermined period of time, control circuitry 304 may determine that the user is likely to be interested in the advertisement. Thus, control circuitry 304 may refrain from generating for presentation the option to skip the advertisement for the remainder of the advertisement content and present the entire advertisement to the user. As another example, a decision whether to present the skip ad button may be based on whether the user expresses joy or enthusiasm during the presentation of the advertisement (e.g., based on a detected vocal and/or physical response by the user to the advertisement). Accordingly, such option may be presented upon determining that the user is not likely to be interested in the advertisement content (and thus is less likely to pay attention to the advertisement). On the other hand, in a circumstance where the user is enjoying the advertisement, unnecessary or inadvertent skipping of the advertisement content can be avoided by refraining from presenting the option to skip the advertisement. For example, a situation can be avoided where the option to skip the advertisement content is selected inadvertently, such as by force of habit, and only later does the user realize that the advertisement was of interest.

At step 512, if the option to skip the advertisement is either not enabled or not selected, control circuitry 304 may wait until the advertisement content ends, and, upon determining that the advertisement content ends, present the selected media content at step 520 (e.g., selected media asset 102 in FIG. 1A).

Additionally or alternatively to monitoring the user response to the advertisement, the control circuitry may access user profile information 114 to determine whether the user is likely to be interested in the advertisement. The user profile information 114 may indicate what type of content the user is likely to find interesting (e.g., certain automobile companies, or a trailer for action movies). Based on such information, control circuitry 304 may determine whether an option to skip an advertisement (e.g., option 116 in FIG. 1A) should be presented to the user. For example, if a current media asset relates to the content included in the user profile information (e.g., a commercial for an automobile company specified in the profile of the user), the option to skip the advertisement may not be generated for presentation. On the other hand, if the current media asset is unrelated to information in the user profile, viewing history, or other retrieved information associated with the user, the skip advertisement button may be generated for presentation (e.g., after a predetermined period of time elapses from the start of the advertisement content). As another example, in the case of multi-part advertisements, if a user previously enjoyed a first part of an ad, the content presentation application may determine that the user is likely to enjoy a second part of the advertisement, and thus may refrain from presenting the skip ad option during the second part of the multi-part advertisement.

In some embodiments, an artificial intelligence system (e.g., machine learning model) may be utilized to predict, based on past viewing history of the user, whether the user is likely to be interested in the advertisement content (or a portion thereof). For example, based on a probability output by the machine learning model, the selectable option to skip advertisement content may be shown after a certain portion of the advertisement content has ended (e.g., if the probability of the user being interested in the next portion is below a predetermined threshold), or the selectable option may not be shown at all (e.g., if the probability of the user being interested in any of the advertisement content is above a predetermined threshold). The machine learning model may be trained based on past history of whether the user was interested in the same or similar advertisements.

Figure 6:
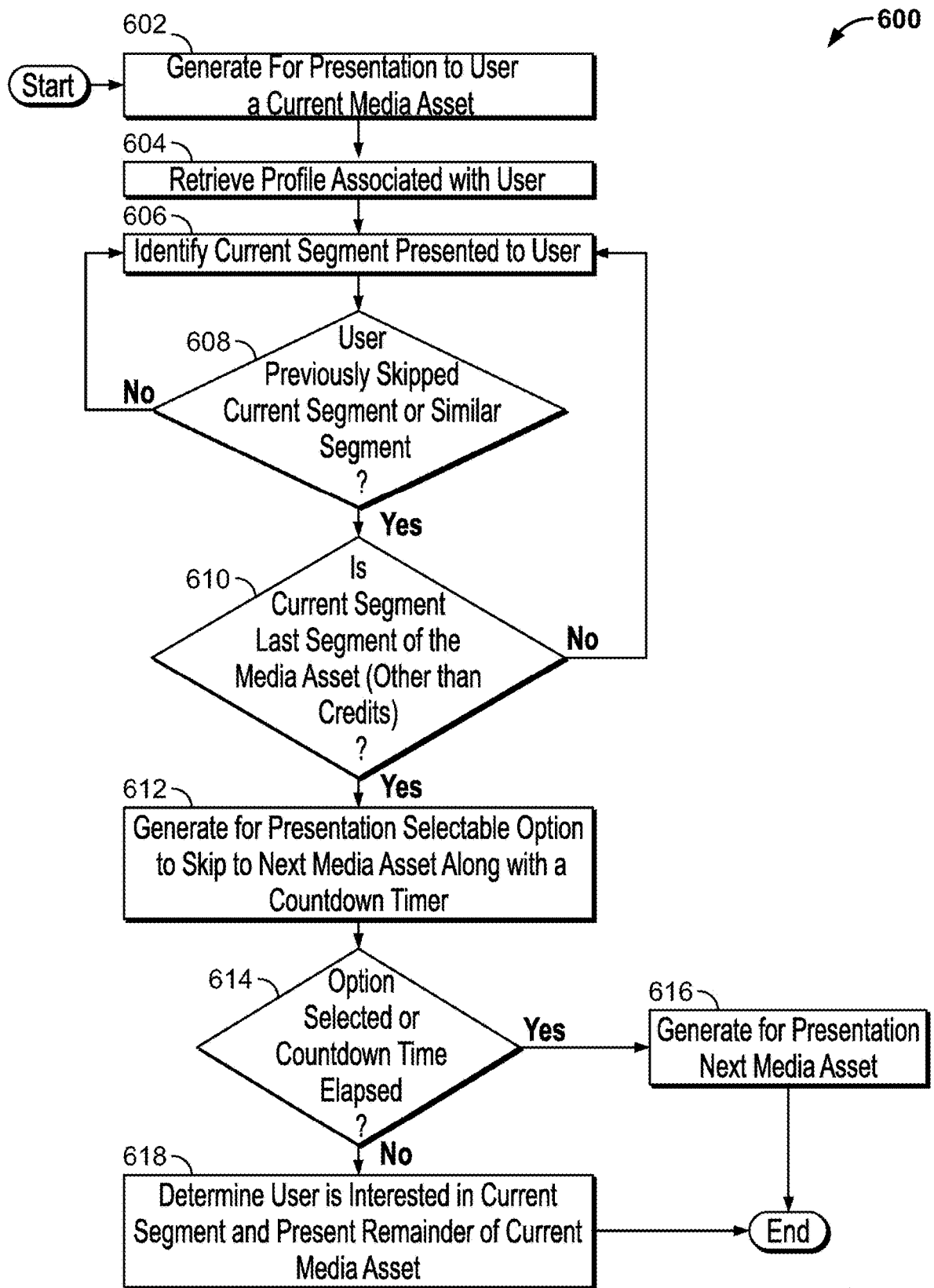
FIG. 6 is a flowchart of a detailed illustrative process for generating for presentation a selectable option to skip presentation of the current media asset and start presentation of a next media asset, in accordance with some embodiments of this disclosure.

FIG. 6 depicts an illustrative flowchart of a process of presenting a selectable option to skip presentation of a current media asset and start presentation of a next media asset, in accordance with some embodiments of the disclosure. Process 600 may be executed by control circuitry 304 (e.g., in a manner instructed to control circuitry 304 by the content presentation application). Control circuitry 304 may be part of user equipment (e.g., a device that may have any or all of the functionality of user television equipment 402, user computer equipment 404, and/or wireless communications device 406), or of content presentation server 416 separated from the user equipment by way of communication network 414, or distributed over a combination of both. In addition, one or more steps of process 600 may be incorporated into or combined with one or more steps of any other process or embodiment (e.g., process 500 of FIG. process 700 of FIG. 7, process 800 of FIG. 8).

At step 602, control circuitry 304 may generate for presentation a media asset (e.g., an episode of the television series "Seinfeld," as shown in the example of FIG. 1B). The media asset may alternatively be any media asset comprising multiple segments (e.g., a news show including headlines, detailed news reports, weather forecast, etc., or a sports show including highlights of a sports game, a discussion of the sports game, a discussion of an upcoming sports game, etc.).

At step 604, control circuitry 304 may retrieve a profile associated with the user. The profile may include a viewing history of the user (e.g., whether the user previously skipped the same or similar segments of the same or similar media assets). At step 606, control circuitry 304 may identify a current segment being presented to the user. For example, the control circuitry 304 may determine (e.g., based on metadata associated with the media asset) that the current segment corresponds to a particular portion of the media asset (e.g., a stand-up portion of a particular episode of "Seinfeld" in the example of FIG. 1A).

At step 608, control circuitry 304 may determine (e.g., based on the viewing history) whether the user is not likely to be interested in a current segment. This determination may be made based on whether the user has previously skipped the current segment (e.g., if the user previously watched the same media asset) and/or whether the user previously skipped a similar segment (e.g., in a different episode of the same series, or a similar series). Alternatively, control circuitry 304 may monitor activity of the user during the current session of consuming the current media asset. For example, if the user has consistently skipped (e.g., fast-forwarded through) particular segments of the current media asset (e.g., where a musical performance is performed by a character in the media asset), control circuitry 304 may detect whether a current scene of the media asset is similar to such skipped portions (and processing may continue to step 610 or step 612 in this instance). On the other hand, if no such segments exist in the viewing history of the user, processing may return to step 606 where control circuitry 304 may continue to monitor the presentation position in the media asset for such a segment.

At step 610, control circuitry 304 may, in some embodiments, determine whether the current segment is the last segment of the media asset (e.g., other than the closing credits). For example, in the example of FIG. 1B, control circuitry 304 may determine that the stand-up act 126 is the last scene prior to the credits (e.g., based on metadata of the media asset), and processing may proceed to step 612. As another example, a media asset may have 3 storylines (e.g., SL1, SL2, SL3) with scenes from each of them interleaved, and if while watching the program, scenes from SL2 were skipped by the user, this may indicate that user is not interested in segments with SL2. Thus, if a scene from SL2 happens to be the last segment of the program, the system may determine that segment is not likely to be of interest to the user.

At step 612, the control circuitry may generate for presentation to a user, upon determining that the current segment is the last segment of the media asset prior to the closing credits, a selectable option (e.g., option 125 in FIG. 1B) to skip to a next media asset (e.g., the next episode in a series, or a media asset having similar characteristics to the current media asset). Such feature may enable a seamless transition to the next episode or similar media asset, upon determining the user is not likely to be interested in the current segment (e.g., and the remainder of the episode). In some embodiments, voice input from the user (e.g., detected by a microphone) can trigger the up-next functionality, or selection of the option (e.g., via remote control or a touch screen display) can trigger the up-next functionality.

At step 614, the control circuitry may determine whether the option to trigger the up-next functionality has been received, or whether a countdown associated with the functionality has elapsed.

At step 616, if selection of the option is received, or selection of the countdown expires (e.g., a 10-second countdown in the example of FIG. 1B), control circuitry 304 may stop presentation of the current media asset and begin presentation of the next media asset. Accordingly, up-next functionality may be dynamically triggered based on user's preferences or user history. In some embodiments, an affirmative response or permission from the user may be required in order to trigger the up-next functionality (e.g., there may be no countdown, or expiration of the countdown without user selection may not be sufficient to trigger the up-next functionality).

At step 618, the control circuitry may determine that the user is still interested in the current segment and present the remainder of the current media asset. For example, a response may be required from the user to trigger the up-next functionality (e.g., if the countdown expires without receiving user selection of the selectable option, the up-next functionality may not be triggered), or the user may stop the up-next functionality from occurring (via voice input, such as "Ignore", or by selecting the "cancel" option shown in the example of FIG. 1B).

Figure 7:
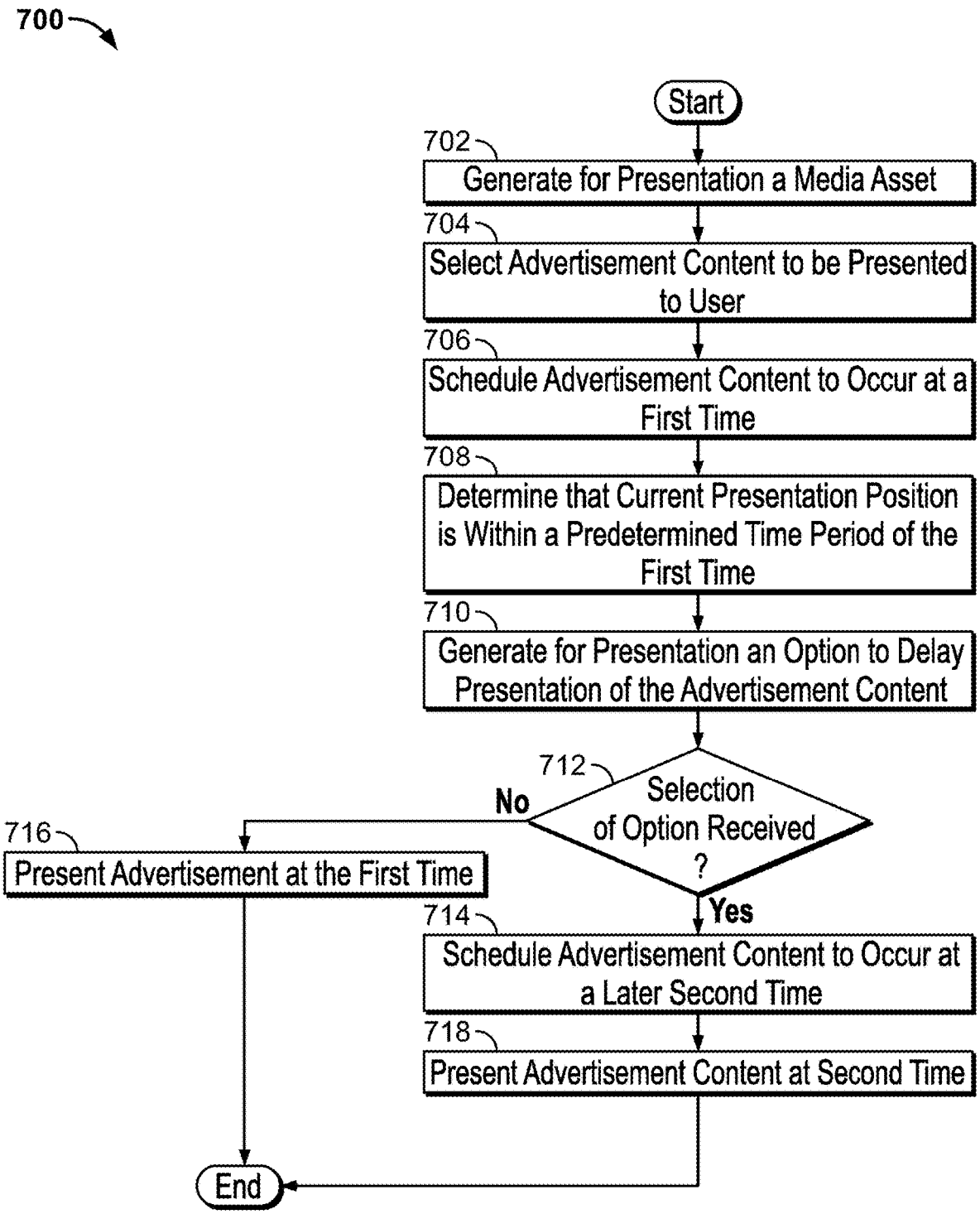
FIG. 7 is a flowchart of a detailed illustrative process for scheduling an action to occur at a later second time within the presentation of a media asset, in accordance with some embodiments of this disclosure.

FIG. 7 depicts an illustrative flowchart of a process of scheduling an action to occur at a later second time within the presentation of a media asset, in accordance with some embodiments of the disclosure. Process 700 may be executed by control circuitry 304 (e.g., in a manner instructed to control circuitry 304 by the content presentation application). Control circuitry 304 may be part of user equipment (e.g., a device that may have any or all of the functionality of user television equipment 402, user computer equipment 404, and/or wireless communications device 406), or of content presentation server 416 separated from the user equipment by way of communication network 414, or distributed over a combination of both. In addition, one or more steps of process 700 may be incorporated into or combined with one or more steps of any other process or embodiment (e.g., process 500 of FIG. 5, process 600 of FIG. 6, process 800 of FIG. 8).

At step 702, control circuitry 304 may generate for presentation a media asset (e.g., media asset 201 shown in the example of FIG. 2) to a user. At step 704, control circuitry 304 may retrieve advertisement content (e.g., content 203 in FIG. 2) to be presented to the user, and at step 706, control circuitry 304 may define a first time (e.g., time 204, included in time range or time interval 208 within the presentation of the media asset 201) at which the advertisement is scheduled to occur. Such process is discussed in more detail in FIG. 8.

At step 708, control circuitry 304 may monitor the presentation of the current media asset and determine that a current presentation position (e.g., presentation position 202 in FIG. 2) is approaching the first time. For example, control circuitry 304 may determine that the current presentation position is within a predetermined time period (e.g., 20 seconds) of the first time.

At step 710, upon determining that the current presentation position is within the predetermined time period of the first time, control circuitry 304 may generate for presentation an option to delay the action (e.g., option 205 to delay presentation of the advertisement content). For example, as shown in FIG. 2, selectable option 205 may be presented to the user, to provide an opportunity for delaying or postponing the advertisement content for a specified delay time (e.g., so that the presentation of the current media asset to the user is not interrupted, such as during a scene of the media asset that the user is engaged or invested in and may not want to be interrupted). In some embodiments, a countdown may be generated for presentation, to indicate to the user that the advertisement will be presented in a specified amount of time, unless the user elects to delay the advertisement.

At step 712, control circuitry 304 may receive selection of the option to delay the action. Such selection may be received in a variety of ways (e.g., via remote control, via voice input, via a touch screen display, etc.).

At step 714, upon receiving selection of the option to delay the action, the content presentation application may schedule the advertisement to occur at a later second time (e.g., at time 207 within the predefined time interval 208). For example, as shown on the display screen in the bottom right of FIG. 2, upon receiving user selection to delay the advertisement, the current presentation position 202 may proceed past the first time 204, without presenting the advertisement content, and the advertisement may be scheduled to occur at the second time 207. In some embodiments, if a delay time associated with the selectable option exceeds the amount of time remaining in the time interval (e.g., time interval 208 in FIG. 2), the user may not be permitted to delay the advertisement, and the advertisement may be played at the current time, or the presentation of the advertisement may be delayed until the end of the time interval (e.g., cutoff point 206 in FIG. 2). If the user delays the action until the end of the time interval, the action may automatically be performed at the end of the time interval.

At step 718, the advertisement content may be presented at the scheduled second time. In some embodiments, the user may be presented with an option to further delay the action, past the second time, to a later third time. The third time may still be within the time interval (e.g., time interval 208 in FIG. 2). In some embodiments, if the delay time exceeds the amount of time remaining in the time interval, the user may not be permitted to delay the advertisement, and the advertisement may be played at the current time. Alternatively, the presentation of the advertisement may be delayed until the end of the time interval (e.g., without providing the user with an opportunity to further delay the advertisement). An appropriate message may be displayed (e.g., "Ads cannot be delayed beyond this point" or "Ads cannot be delayed any further") in order to notify the user.

In some embodiments, the option to delay the action may be presented to the user no more than a predetermined number of times, and/or the user may lose an opportunity to skip a subsequent advertisement each time the option to delay the advertisement is selected. Further, each time the option to delay the action is selected by the user, control circuitry 304 may determine that the length of the action (e.g., the advertisement interrupting the presentation of the media asset) should become longer. In some embodiments, the more that an advertiser pays to the media asset provider for the right to present advertisements during media content, the longer the duration of the advertisement may be, and/or the shorter the delay times may be. In addition, the user may be charged a certain price in order to skip an advertisement, and the advertiser may be paid a portion of such price to compensate for lost revenue associated with skipping the advertisement. In some aspects of this disclosure, control circuitry 304 may identify the moments within the runtime interval likely to be of highest interest to the user, and delay the advertisement content to a next-highest-interest moment each time a selection to delay or further delay the advertisement content is received.

At step 716, if selection of the option is not received (e.g., prior to the end of the countdown), the advertisement may be presented at the scheduled first time (e.g., time 204 in FIG. 2). In some embodiments, multiple advertisements (e.g., related or unrelated) may be shown consecutively at the scheduled time. In some aspects of this disclosure, multiple actions (e.g., presentation of multiple advertisements) may be scheduled within the presentation of the media asset at respective mutually exclusive runtime intervals. The control circuitry may perform the processing in FIG. 7 for each of such multiple advertisements at the respective runtime intervals, until either all of the runtime intervals expire, or if the media content presentation is canceled by the user (e.g., prior to presenting all or the media content).

Figure 8:
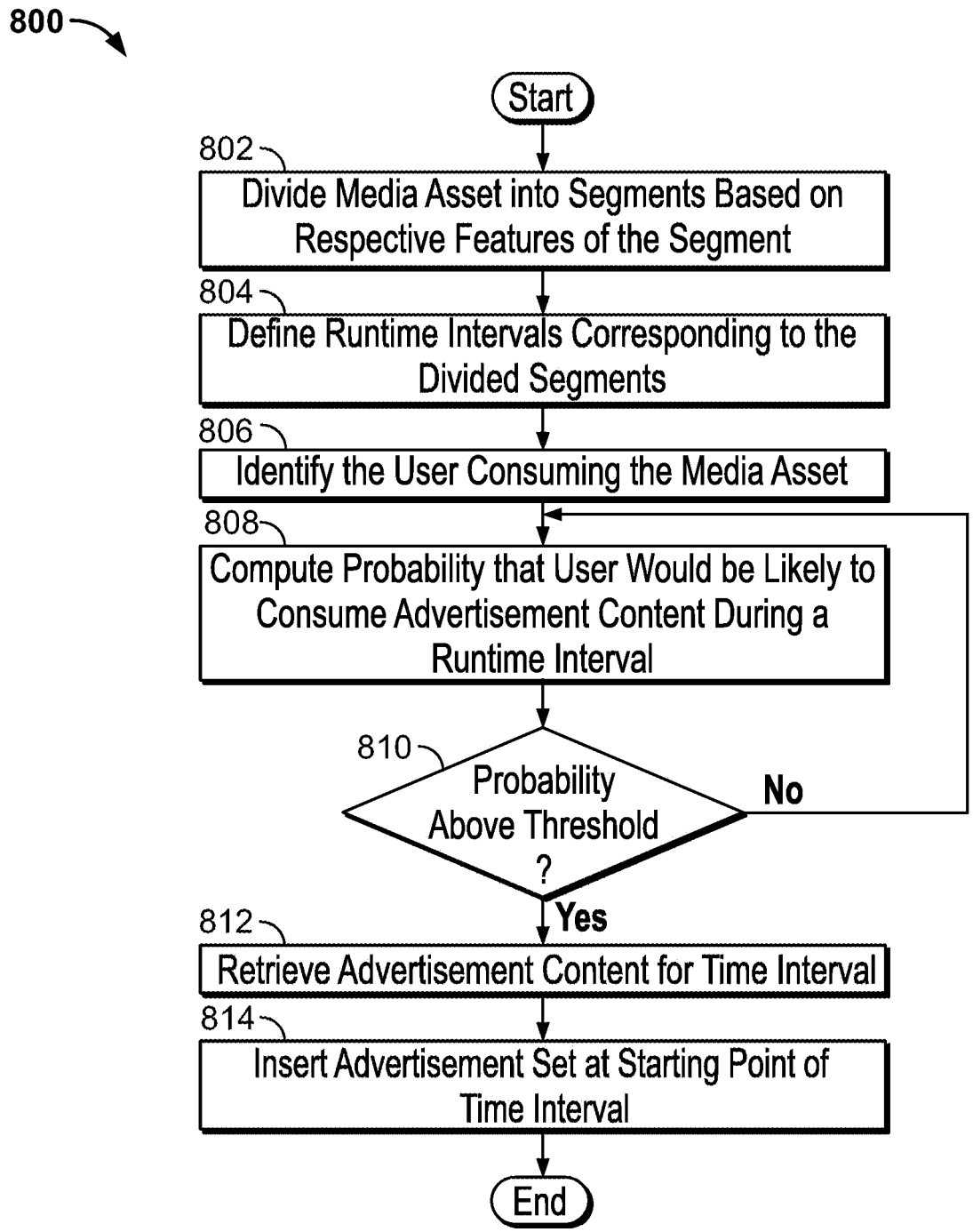
FIG. 8 is a flowchart of a detailed illustrative process for scheduling one or more actions to occur within the presentation of a media asset, in accordance with some embodiments of this disclosure.

FIG. 8 depicts an illustrative flowchart of a process of scheduling one or more actions to occur within the presentation of a media asset, in accordance with some embodiments of the disclosure. Process 800 may be performed by the content presentation application (e.g., executed by control circuitry 304, such as in a manner instructed to control circuitry 304 by the content presentation application). Control circuitry 304 may be part of user equipment (e.g., a device that may have any or all of the functionality of user television equipment 402, user computer equipment 404, and/or wireless communications device 406), or of content presentation server 416 separated from the user equipment by way of communication network 414, or distributed over a combination of both. In addition, one or more steps of process 800 may be incorporated into or combined with one or more steps of any other process or embodiment (e.g., process 500 of FIG. 5, process 600 of FIG. 6, process 700 of FIG. 7).

At step 802, the content presentation application (e.g., executed by control circuitry 304 of content presentation server 416 of FIG. 4 and/or control circuitry of a user equipment device) may determine the runtime of a current media asset and divide such runtime of the media asset into mutually exclusive segments. For example, the segments of the media asset (e.g., video segments) may be divided up based on a scheme not based on the media asset content (e.g., based on time periods or randomly, or based on one or more of the following content features: story line or subject of the segment, characters and/or objects included in the segment, background of the segment, audio, music, or annotations of the segment, acting quality of the segment, cinematic quality of the segment, amount of details in the segment, etc. Such content features may be identified based on metadata associated with the current media asset and/or any suitable image or audio processing techniques.

At step 804, the content presentation application may identify mutually exclusive, discrete runtime intervals corresponding to the segment-wise division of the current media asset. For example, one or more respective actions (e.g., the presentation of advertisement content, such as advertisement content 203 in FIG. 2) may be scheduled to occur within each respective runtime interval, at a beginning of each respective interval. In some embodiments, the segments may be sorted from a lowest runtime interval length to a highest runtime interval length, from the beginning of the media asset to the end of the media asset.

At step 806, the content presentation application may identify the user consuming the current media asset. For example, the content presentation application may identify the interests of the user (e.g., based on a viewing history or profile of the user), and adjust the time intervals and/or division of segments based on the identified user interests. Alternatively, the content presentation application may determine the interests of the user prior to steps 802 and 804, and divide the segments and define the runtime intervals based on such identified user interests.

At step 808, the content presentation application may compute a probability that the user is likely to consume the advertisement content during a runtime interval of the one or more runtime intervals. In some embodiments, the probability may be computed based on a comparison between the interests of the user (e.g., as identified based on the user profile or user viewing history) and the features of each of the divided segments.

At step 810, the content presentation application may determine whether the probability exceeds a predetermined threshold. If the content presentation application determines that the probability exceeds the predetermined threshold, processing may proceed to step 812. If the content presentation application determines that the probability does not exceed the predetermined threshold, the content presentation application may determine that no advertisement content should be presented at the particular runtime interval. Rather, processing may return to step 808 and the content presentation application may wait for the next runtime interval, and calculate a new probability that the user is likely to view the advertisement content during such next runtime interval. Such process may be continued until the end of the media asset, or until there are no more runtime intervals left in the presentation of the media asset.

At step 812, the content presentation application may retrieve advertisement content (e.g., from an advertisement content database), in response to determining that the computed probability exceeds the predetermined threshold. At step 814, the advertisement content may be inserted at the starting time point of the runtime interval. At this point, the content presentation application may perform the processing that begins at step 708 of FIG. 7 (e.g., determine whether the current presentation position is approaching such starting time point of the runtime interval). In some embodiments, a runtime interval may be inserted at the start of the presentation of the current media asset.

It is contemplated that the steps or descriptions of FIGS. 5-8 may be used with any other embodiment of this disclosure. In addition, the descriptions described in relation to the algorithm of FIGS. 5-8 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the processes of FIGS. may be implemented on a combination of appropriately configured software and hardware, and that any of the devices or equipment discussed in relation to FIGS. 1-4 could be used to implement one or more portions of the process.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method of managing presentation of content, the method comprising:
   receiving, from a user, a request to access a first media asset;
   in response to receiving the request to access the first media asset, generating for presentation a second media asset prior to generating for presentation the first media asset;
   monitoring audio of the user while the second media asset is being generated for presentation, wherein the monitoring is performed after receiving the request to access the first media asset;
   determining, based on the monitored audio of the user, whether the presentation of the second media asset is not likely to be of interest to the user;
   in response to determining that the presentation of the second media asset is not likely to be of interest to the user, generating for presentation a selectable option to skip presentation of the second media asset and start presentation of the first media asset; and
   in response to receiving selection of the selectable option, generating for presentation the first media asset.

2. The method of claim 1, wherein:
   the second media asset is advertisement content;
   determining whether the presentation of the second media asset is not likely to be of interest to the user comprises determining whether the audio of the user is indicative of the user being interested in the advertisement content;
   wherein the method further comprises:
   in response to determining that the audio of the user is indicative of the user being interested in the advertisement content, refraining from generating for presentation the selectable option.

3. The method of claim 2, wherein determining whether the audio of the user is indicative of the user being interested in the advertisement content comprises determining whether the audio of the user matches audio of the advertisement content.

4. The method of claim 3, wherein:
   the advertisement content is associated with metadata, the metadata comprising text that corresponds to the audio of the advertisement content; and
   determining whether the audio of the user matches the audio of the advertisement content comprises:
   transcribing the audio of the user to text; and
   comparing the text indicated in the metadata to the text obtained by transcribing the audio of the user.

5. The method of claim 3, wherein determining whether the audio of the user matches the audio of the advertisement content comprises:
   detecting acoustic characteristics of the audio of the user;
   determining acoustic characteristics of the audio of the advertisement content; and
   comparing the acoustic characteristics of the audio of the user to the acoustic characteristics of the audio of the advertisement content.

6. The method of claim 3, wherein the audio of the advertisement content comprises audio of a song or a jingle.

7. The method of claim 2, further comprising:
   determining that the advertisement content is a multi-part advertisement, wherein the second media asset is a first part of the multi-part advertisement; and
   in response to determining that the audio of the user is indicative of the user being interested in the first part of the multi-part advertisement:

refraining from generating for presentation the selectable option during each of the first part of the multi-part advertisement and a second part of the multi-part advertisement.

8. The method of claim 1, further comprising:
identifying one or more preferences indicated in a profile of the user; and
determining whether the presentation of the second media asset is not likely to be of interest to the user is further based on comparing the one or more preferences indicated in the profile of the user to one or more attributes of the second media asset.

9. The method of claim 1, further comprising:
receiving input to skip presentation of a portion of the first media asset being generated for presentation;
determining that an upcoming portion of the first media asset is similar to the skipped portion of the first media asset; and
in response to determining that the upcoming portion of the first media asset is similar to the skipped portion of the first media asset, generating for presentation a selectable option to skip presentation of the upcoming portion of the first media asset.

10. The method of claim 1, wherein the first media asset comprises a plurality of episodes of episodic content, the method further comprising:
identifying a profile of the user;
determining a type of content of a current portion of a first episode of the plurality of episodes;
determining that the profile of the user indicates that in one or more other episodes of the episodic content consumed by the user, a request was received from the user to skip one or more portions of the one or more other episodes corresponding to the type of content;
in response to determining that the request was received in the one or more other episodes, generating for presentation a selectable option to skip presentation of the current portion of a first episode and start presentation of a second episode of the plurality of episodes; and
based on receiving selection of the selectable option to skip the presentation of the current portion of the first episode, generating for presentation the second episode.

11. A computer-implemented system of managing presentation of content, the system comprising:
computer memory;
control circuitry configured to:
receive, from a user, a request to access a first media asset, wherein a profile of the user is stored in the computer memory;
in response to receiving the request to access the first media asset, generate for presentation a second media asset prior to generating for presentation the first media asset;
monitor audio of the user while the second media asset is being generated for presentation, wherein the control circuitry performs the monitoring after receiving the request to access the first media asset;
determine, based on the monitored audio of the user, whether the presentation of the second media asset is not likely to be of interest to the user;
in response to determining that the presentation of the second media asset is not likely to be of interest to the user, generate for presentation a selectable option to skip presentation of the second media asset and start presentation of the first media asset; and
in response to receiving selection of the selectable option, generate for presentation the first media asset.

12. The system of claim 11, wherein:
the second media asset is advertisement content; and
the control circuitry is further configured to:
determine whether the presentation of the second media asset is not likely to be of interest to the user by determining whether the audio of the user is indicative of the user being interested in the advertisement content; and
in response to determining that the audio of the user is indicative of the user being interested in the advertisement content, refrain from generating for presentation the selectable option.

13. The system of claim 12, wherein the control circuitry is configured to determine whether the audio of the user is indicative of the user being interested in the advertisement content by determining whether the audio of the user matches audio of the advertisement content.

14. The system of claim 13, wherein:
the advertisement content is associated with metadata, the metadata comprising text that corresponds to the audio of the advertisement content; and
the control circuitry is configured to determine whether the audio of the user matches the audio of the advertisement content by:
transcribing the audio of the user to text; and
comparing the text indicated in the metadata to the text obtained by transcribing the audio of the user.

15. The system of claim 13, wherein the control circuitry is configured to determine whether the audio of the user matches the audio of the advertisement content by:
detecting acoustic characteristics of the audio of the user;
determining acoustic characteristics of the audio of the advertisement content; and
comparing the acoustic characteristics of the audio of the user to the acoustic characteristics of the audio of the advertisement content.

16. The system of claim 13, wherein the audio of the advertisement content comprises audio of a song or a jingle.

17. The system of claim 12, wherein the control circuitry is further configured to:
determine that the advertisement content is a multi-part advertisement, wherein the second media asset is a first part of the multi-part advertisement; and
in response to determining that the audio of the user is indicative of the user being interested in the first part of the multi-part advertisement:
refrain from generating for presentation the selectable option during each of the first part of the multi-part advertisement and a second part of the multi-part advertisement.

18. The system of claim 11, wherein the control circuitry is further configured to:
identify one or more preferences indicated in the profile of the user; and
determine whether the presentation of the second media asset is not likely to be of interest to the user is further based on comparing the one or more preferences indicated in the profile of the user to one or more attributes of the second media asset.

19. The system of claim 11, wherein the control circuitry is further configured to:
receive input to skip presentation of a portion of the first media asset being generated for presentation;

determine that an upcoming portion of the first media asset is similar to the skipped portion of the first media asset; and in response to determining that the upcoming portion of the first media asset is similar to the skipped portion of the first media asset, generate for presentation a selectable option to skip presentation of the upcoming portion of the first media asset.

20. The system of claim 11, wherein the first media asset comprises a plurality of episodes of episodic content, and the control circuitry is further configured to:

identify the profile of the user;

determine a type of content of a current portion of a first episode of the plurality of episodes;

determine that the profile of the user indicates that in one or more other episodes of the episodic content consumed by the user, a request was received from the user to skip one or more portions of the one or more other episodes corresponding to the type of content;

in response to determining that the request was received in the one or more other episodes, generate for presentation a selectable option to skip presentation of the current portion of a first episode and start presentation of a second episode of the plurality of episodes; and based on receiving selection of the selectable option to skip the presentation of the current portion of the first episode, generate for presentation the second episode.

* * * * *